(12) United States Patent
Li (10) Patent No.: US 11,287,945 B2
(45) Date of Patent: Mar. 29, 2022

(54) SYSTEMS AND METHODS FOR GESTURE INPUT

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 0 days.

(21) Appl. No.: 17/156,604

(22) Filed: Jan. 24, 2021

(65) Prior Publication Data

US 2021/0141511 A1    May 13, 2021

Related U.S. Application Data

(63) Continuation-in-part of application No. 15/259,061, filed on Sep. 8, 2016, now abandoned.

(51) Int. Cl.
*G06F 17/00*       (2019.01)
*G06F 3/04812*    (2022.01)
*G06F 3/01*        (2006.01)

(52) U.S. Cl.
CPC .......... *G06F 3/04812* (2013.01); *G06F 3/017* (2013.01)

(58) Field of Classification Search
CPC ............................. G06F 3/04812; G06F 3/017
USPC ................................................. 715/243, 711
See application file for complete search history.

(56) References Cited

U.S. PATENT DOCUMENTS

| | | | |
|---|---|---|---|
| 6,519,553 B1* | 2/2003 | Barnette | G06F 17/17 703/2 |
| 8,122,347 B2* | 2/2012 | Yamakado | G06F 40/103 715/255 |
| 9,400,597 B2* | 7/2016 | Schormann | G06F 3/04845 |
| 10,019,072 B2* | 7/2018 | Hwang | G06F 3/018 |
| 10,175,781 B2* | 1/2019 | Karagozler | G06F 3/0446 |
| 2004/0239693 A1* | 12/2004 | Mullen | G06F 3/04845 345/677 |
| 2008/0082468 A1* | 4/2008 | Long | G06K 9/6256 706/12 |
| 2013/0096899 A1* | 4/2013 | Usadi | E21B 43/00 703/10 |
| 2014/0109016 A1 | 4/2014 | Ouyang et al. | |
| 2015/0002391 A1 | 1/2015 | Chen | |
| 2016/0110907 A1 | 4/2016 | Kelly et al. | |
| 2017/0010776 A1 | 1/2017 | Stewart | |

OTHER PUBLICATIONS

Eugene Ch'ng, 'Screen Design: a dynamic symmetry grid based approach', Faculty of Information technology, Multimedia University, 63100 Cyberjaya, Malaysia, 2003 (Year: 2003).*
Feiner, 'An Experimental System for Creating and Presenting Interactive Graphical Documents', ACM Transactions on Graphics, vol. 1, Jan. 1982 (Year: 1982).*

* cited by examiner

*Primary Examiner* — Stephen S Hong
*Assistant Examiner* — Matthew J Ludwig (57) ABSTRACT

Systems and methods for gesture input. In an aspect, the screen grid is configured based on locations of objects. In another aspect, the effective area of an object is adjustable on screen. In yet another aspect, temporary icons are arranged for performing left and right clicks.

14 Claims, 6 Drawing Sheets

SYSTEMS AND METHODS FOR GESTURE INPUT

CROSS REFERENCE TO RELATED APPLICATION

This is a continuation-in-part of U.S. patent application Ser. No. 15/259,061, filed Sep. 8, 2016.

BACKGROUND

Field of Invention

This invention generally relates to gesture input and specifically to input using finger or hand gestures at an electronic device.

BACKGROUND

Description of Prior Art

A user may enter input at an electronic device via a keyboard, a computer mouse, a touch pad, a touch screen, or other hardware components. In some cases, however, these methods are inconvenient or unavailable. For instance, when a computer is mounted on a wall in a public area, there may be no keyboard, touch pad, or mouse provided, and it may be too high to reach. In such a case, gesture input may be an effective way for a user to interact with the computer. In addition, a computer placed at a public venue may serve a few purposes only. For instance, users may mostly select an object on screen to access needed information, or turn a page and then select another object to get information. When the primary task is to reach an on-screen object, a traditional fixed fine grid may become an issue, since moving a cursor by tiny steps is not only unnecessary, but also slow.

Therefore, there exists a need for a gesture input method that makes it easy to select a graphic object on screen and a need to improve the configuration of screen grid.

For some small wearable or portable devices, a small touch screen may be the main user interface. Consequently, a graphic object, which has to be big enough for a fingertip to select, may take a sizable screen space. Thus only a few objects may be arranged on a screen, even though more on-screen objects need to be displayed.

Therefore, there exists a need to arrange more graphic objects on a small screen.

Unlike the computer mouse or touch pad, when gesturing is used as an input method, often-used actions like click, drag, left click, and right click may not be easily carried out due to lack of mechanical assistance. On the other hand, a complicated gesture act may not help either, since it may confuse or even scare away users.

Therefore, there exists a need for a gesture input method that is simple and easy to use.

"Graphic object", "object", "icon", and "button", as used herein, each indicate a graphic identifier on a display screen and the four may be treated equally in the following descriptions. Sometimes, "button" also means a hard physical button arranged on a device body, which may be easily recognized. An on-screen "graphic object", "object", "icon", and "button" may be associated with an application, a computer file, a device function, or certain content of computer information. As entities on a screen, the graphic objects may be highlighted and activated by a click act via a computer mouse. When an object is highlighted, its appearance and/or appearance of the area surrounding it within a boundary may be arranged to change conspicuously. For instance, the color of an object or its boundary line may become brighter. Highlighting may happen, for instance, when a cursor overlaps an object or moves into the boundary of an object. Clicking on a highlighted object, or tapping an object directly on a touch screen, may cause activation. Activating an object means a corresponding application may be launched, a file may be opened, or certain content may be presented. An on-screen object provides an easy and convenient way to reach an application, a file, a webpage, or data. In many cases, when an object is visible on screen, it indicates the object is accessible and executable.

OBJECTS AND ADVANTAGES

Accordingly, several main objects and advantages of the present invention are:

a). to provide an improved method and system for gesture input;

b). to provide such a method and system which have an object-based screen grid for easy access of objects through gestures;

c). to provide such a method and system which have an automatic screen grid setting for easy access of objects through gestures;

d). to provide such a method and system which enlarge the object boundary on screen for easy access through gestures;

e). to provide such a method and system which utilize gestures to access small objects on a small screen;

f). to provide such a method and system which enable functions of click, drag, left-click, and right-click via gestures;

g). to provide such a method and system which arrange temporary icons around an object to offer options; and h). to provide such a method and system which arrange simple methods to turn on a gesture sensor and start gesture input session.

Further objects and advantages will become apparent from a consideration of the drawings and ensuing description.

SUMMARY

In accordance with the present invention, methods and systems are illustrated for easy and convenient gesture input. Screen grid may be object based and adjusted automatically by positions of graphic objects. The effective area of a graphic object may be enlarged for easy access. Object-based grid and enlarged effective area may make gesture input efficient and convenient. Gestures may be used to access small objects on a small screen. Gestures may also be used to perform click act. Temporary icons may be arranged around a graphic object for functions such as left click, right click, and drag. Simple methods may be used to turn on a gesture sensor and start a gesture input session.

DRAWING FIGURES

FIGS. 3-A and 3-B are exemplary diagrams showing embodiments of object-based grid in accordance with the present invention.

FIGS. 4-A and 4-B use exemplary diagrams to show the enlarged boundary of on-screen objects in accordance with the present invention.

FIGS. 5-A and 5-B are exemplary diagrams showing display of objects on a small screen and access of small objects by gestures in accordance with the present invention.

FIGS. 6-A, 6-B, and 7 employ exemplary diagrams to illustrate gesture instructions in accordance with the present invention.

FIGS. 8-A, 8-B, 8-C and 8-D are exemplary diagrams showing generation of temporary icons around a highlighted graphic object.

FIGS. 14-A and 14-B are exemplary diagrams showing remote control of a television via gestures in accordance with the present invention.

| REFERENCE NUMERALS IN DRAWINGS | |
|---|---|
| 10 Grid | 12 Grid |
| 14 Screen | 16 Screen |
| 18 Object | 20 Object |
| 22 Object | 24 Sensor |
| 26 Sensor | 28 Sensor |
| 30 Processor | 32 Computer Readable Medium |
| 34 Screen | 36 Device |
| 38 Grid | 40 Grid Point |
| 42 Grid Point | 44 Grid Point |
| 46 Grid Point | 48 Screen |
| 50 Finger | 52 Screen |
| 54 Object | 56 Object |
| 58 Object | 60 Screen |
| 62 Object | 64 Object |
| 66 Object | 68 Smartphone |
| 70 Screen | 72 Button |
| 74 Button | 76 Cursor |
| 78 Boundary | |
| 100, 102, 104, 106, and 108 are exemplary steps. | |

DETAILED DESCRIPTION

Figure 1:
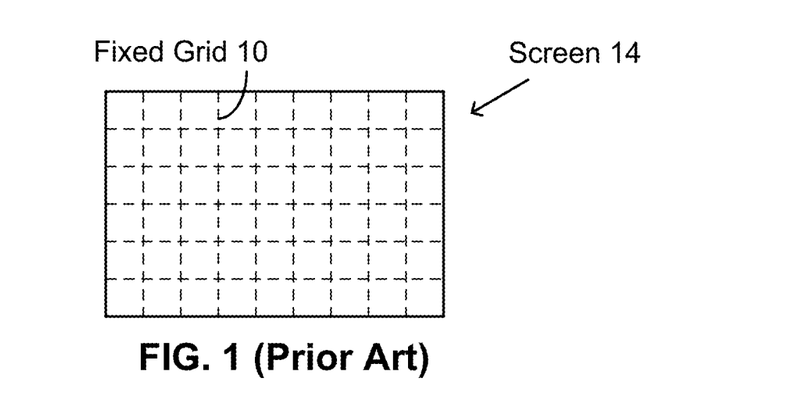
FIG. 1 shows a prior-art screen grid design.

FIG. 1 shows a prior-art grid design. On a screen 14, there is a traditional grid 10 with fixed grid spacing which is designed to meet all needs. Resultantly, the grid spacing is usually made as fine as it is allowed to accommodate tasks requiring tiny steps, e.g., a drawing work. Usually, a user won't adjust a default grid setting, and the grid setting would keep the original values and stay unchanged.

Figure 2:
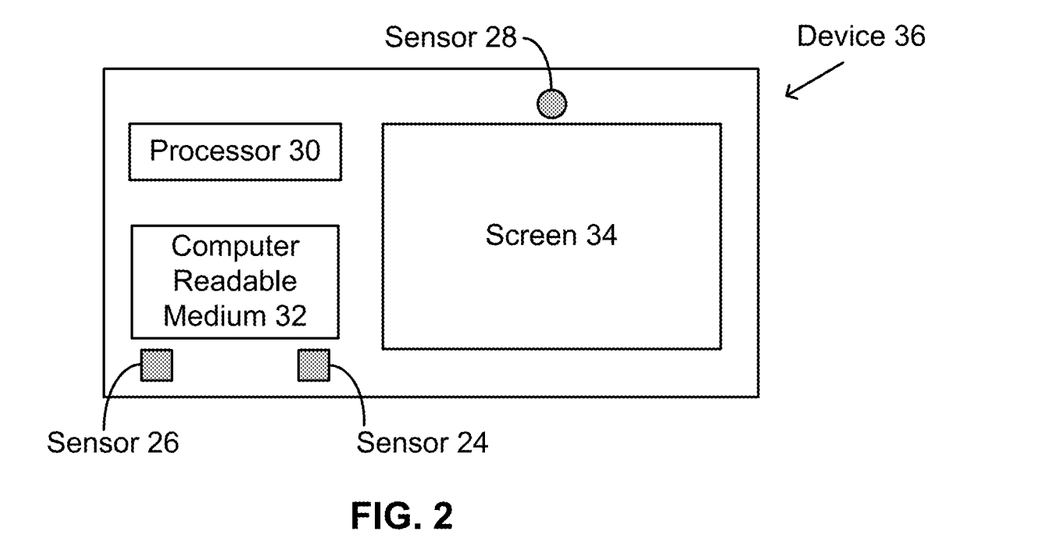
FIG. 2 is an exemplary block diagram describing one embodiment in accordance with the present invention.

FIG. 2 is an illustrative block diagram of one embodiment according to the present invention. A client device 36 may represent an electronic device, including but not limited to a mobile phone, smart phone, smart watch, smart band, smart ring, other wearable devices, desktop computer, hand-held computer, tablet computer, wall-mounted computer for public use, television, virtual reality (VR) device, augmented reality (AR) device, and the like. Device 36 may include a processor 30 and computer readable medium 32. Processor 30 may indicate one or more processor chips or systems. Medium 32 may include a memory hierarchy built by one or more memory chips or storage modules like RAM, ROM, FLASH, magnetic, optical and/or thermal storage devices. Processor 30 may run programs or sets of executable instructions stored in medium 32 for performing various functions and tasks, e.g., surfing on the Internet, accessing website or online info, placing phone call, playing video or music, gaming, electronic payment, social networking, sending and receiving email, short message, file, and data, executing other applications, etc. Device 36 may also include input, output, and communication components, which may be individual modules or integrated with processor 30. The communication components may connect the device to another device or a communication network. In some cases, device 36 may have a display with, for example, a screen 34 and a graphical user interface (GUI). A display may have a liquid crystal display (LCD) screen, organic light emitting diode (OLED) screen (including active matrix OLED (AMOLED) screen), or LED screen. A screen surface may be made sensitive to touches, i.e., sensitive to haptic and/or tactile contact with a user, especially in the case of smart phone, tablet computer, smart watch, smart ring, and other wearable devices. A touch screen may be used as a convenient tool for a user to enter input and interact with a system. Furthermore, device 36 may also have a voice recognition component for receiving verbal command or audio input from a user. For VR and AR devices and some wearable devices, a virtual screen or screen having a very small size may be arranged. While it may be impossible or inconvenient to tap an object on such a screen physically, input via a verbal command and gesture instructions may become useful for users.

A communication network which device 36 may be connected to may cover a range of entities such as the Internet or the World Wide Web, a local area network (LAN), a wide area network (WAN), a metropolitan area network (MAN), a telephone network, an intranet, wireless, and other types of networks. Device 36 may be connected to a network by various wired, wireless, optical, infrared, ultrasonic, or other communication means. Via a network, device 36 may communicate with a remote server or service center to send data, receive data and message, and follow up with instructions in the message.

Device 36 may include an optical sensor 28 which may be used as a video camera to detect user gestures using certain algorithm. Gestures may include finger or hand movement of a user. For instance, sensor 28 may capture consecutive images. With certain algorithm, the finger and hand may be recognized in the images. A series of finger and hand images may be collected and analyzed to identify certain moves against predetermined profiles. Then the moves may be interpreted as user commands for the device. Sensor 28 may be built using mature imaging technologies. For some smartphones and tablet computers, sensor 28 may be a front-facing camera module used by users in daily life.

Furthermore, sensor 28 may also be a rear-facing camera module and used to track the eye of a user via mature eye-tracking technologies. In such a scenario, sensor 28 may be designed to sense the facial part of a user and ascertain whether the user gazes at screen 34. To facilitate the latter act, sensor 28 may be arranged very close to screen 34. Besides sensing a general direction, in a more advanced mode, the image of eye may be analyzed to determine where a user is looking at on a screen, places such as the screen top, bottom, left edge, right edge, or a particular area, through algorithms. Both visible and infrared light may be employed for an eye-tracking process. In the infrared case, a specific light source may be arranged to provide a probing beam. Optionally, sensor 28 may include a front-facing camera module and a rear-facing camera module for implementing tasks illustrated above respectively.

Device 36 may include a proximity sensor 26 to detect whether a device is close to a human body or held in hand. Proximity sensing technologies are well known in the art and many smartphones have such a sensing function already. Related methods include infrared, capacitive, inductive, or other suitable technologies.

Moreover, device 36 may contain a motion sensor 24 to detect its own movement by sensing acceleration, deceleration, and rotation. Sensor 24 may employ one or multiple accelerometers and gyroscopes for performing various measurement tasks which may include detecting device shaking, device vibration, device moving of other kinds, and so on. These measurements help detect the conditions and environment of a user and a device. They also make it possible to use shaking, knocking, waving, and other actions which cause a device to move in certain way to convey user instructions. Knocking may mean repeated gentle hits at a part of a device body or a screen. Knock may be applied by a finger, a fingertip, or any object which can cause a hit on a device. Knocking act is preferred to aim at a non-interactive area of a device or at a place where it doesn't have unwanted consequences for application programs at a device. Further, patting a device using a hand or fingers is another kind of knocking. For simplicity reasons, most times knocking is mentioned in the following descriptions, although both knocking and patting may produce the same effect or generate the same user command.

Inside device 36, output signals of sensors may be transmitted to processor 30, which, employed with proper algorithms, may process the data and send a message to a specific application arranged for handling it. The application may process the message and proceed accordingly, such as transferring certain data or instructions back to processor 30, sending messages to another sensor, or turning on a hibernating sensor or device.

Figure 3:
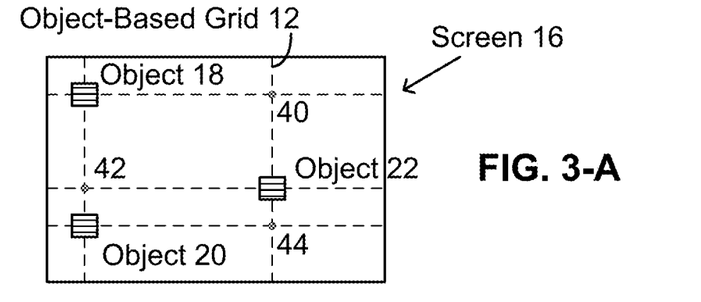

FIGS. 3-A and 3-B describe exemplarily two embodiments of object-based grid according to the invention. There are three graphic objects 18, 20, and 22 on a screen 16. Unlike the fixed traditional grid, a grid 12 in FIG. 3-A may be arranged changeable and determined by positions of on-screen objects. In other words, grid setting may be arranged depending on graphic objects' positions on a screen and adjusted automatically according to the change of the object positions. Hence, after an object is added on or removed from the screen, the grid configuration may be changed instantly by a prearranged program. Automatic grid setting may be used for computers at public venues where seeking certain information is of the main purpose.

Assume that a user is looking at a computer screen inside a museum. To get information, the user may move a cursor to highlight an object on the screen and then click on it to open a content window. The main job here is to move a cursor to overlap an object. The term "overlap" as used herein, may indicate that two images or objects at least partially overlap each other. Thus moving it fast is of the top priority, while fine step resolution or grid resolution may become less important. Since reaching an object with one step is more convenient and efficient than doing it with several steps, a grid with large spacing may become desirable.

In the figures, every grid line goes through at least one object, either in vertical or horizontal direction. There are two vertical lines and three horizontal lines in FIG. 3-A, which creates six grid points, among which three points are taken by the objects. The term "grid point", as used herein, indicates a point where two grid lines intersect or cross each other, or a location where a graphic object is positioned. Since there are six grid points in FIG. 3-A, there are only six places where a cursor may go or stay. For instance, if a cursor is at point 44 or 42, it is only one step away from object 22. In addition, because there are only six grid points, or just six places for cursor to settle in, it is simple to direct a cursor to reach an object site. Object site may indicate an on-screen spot where an object is located. After a cursor is moved to an object site, e.g., a grid point where an object is located, the cursor's image overlaps the object's image. Then the object's image may change color as a way to show it is highlighted or selected.

In FIG. 3-B, objects 18, 20, and 22 remain at the same places on screen 16 as in FIG. 3-A. An exemplary grid 38, also based on object, is displayed schematically. Grid 38 is simpler than grid 12, since there are only two grid lines and four grid points, including three object sites, i.e., spots of three objects. There are one vertical grid line connecting objects 18 and 20, and one horizontal grid line connecting object 22 and a grid point 46. Compared to six grid points of grid 12, grid 38 is further simplified with only four places for cursor to go. Thus, overlapping, highlighting, and activating an object may become more straightforward.

It is well known in the art about how to display a cursor on screen and how to move it around using a computer mouse. There are programs available to create and control a cursor on screen. When finger or hand gestures are used, controlling a cursor may cause issues in some cases, since it may not be easy to make fine steps due to, e.g., a shaky hand in the air or inadequate detecting resolution. Thus, it may be difficult to direct a cursor stably and accurately on a fine grid using gesture input. On the other hand, when the main purpose is to reach an on-screen object, an object-based grid such as grid 12 or 38 illustrated above may become more effective as there are limited places for a cursor to go, there is no need to make tiny steps, and there is fewer problems with a shaky hand. Therefore, when gesture input is used and the main task is to reach on-screen objects, a grid that is based on objects may be desirable.

Grids 12 and 38 may be called object-based grid and concise object-based types, respectively. One difference between grid 12 and grid 38 is of grid point and grid line setting. For grid 12, a grid point is where two grid lines, horizontal and vertical ones, cross each other. So each grid point has two grid lines. For grid 38, a grid point may have either one grid line or two crossing horizontal and vertical grid lines. In the latter case (i.e., grid 38), there are fewer grid points that are not an object site. Both grid 12 and grid 38 may share one feature: Each grid line always goes through at least one object site or each grid line is always controlled by a position of one object. As a cursor only stays at a grid point on screen, the cursor position is always related to the position of one on-screen object on an object-based grid. It may be designed that a user has options to select traditional grid type or one of the object-based grid types. For instance, an "Edit" button may be arranged on screen for enabling "Edit" mode. In "Edit" mode, a user may select a grid type. When a gesture method is used, it becomes quite likely an object-based grid is in need. Thus it may be arranged that a device may automatically change the screen setting from a traditional grid type to an object-based grid type after a gesture session starts, and vice versa after a gesture session comes to an end. For example, an option may be provided in "Edit" mode for a user to select automatic grid type switch between a traditional grid type and an object-based grid type based on whether gesture commands are detected.

The object-based grid may be designed adjustable by the change of object position on screen. In some embodiments, a grid setting program may be created such that any appearance or disappearance of an on-screen object may lead to a change of the grid configuration. For example, when an object is added between point 40 and object 22 on the vertical grid line in FIG. 3-A, a horizontal grid line may be generated accordingly by the grid setting program. The added grid line may go through the added object and produce two grid points. When an object is added between point 46 and object 22 on the horizontal grid line in FIG. 3-B, a grid point may be generated at the new object's position on the existing grid line. But no grid line is added. A new object may also be placed to a spot where no grid line goes through and not related to any location of the existing objects on screen. Then the new object may trigger creation of two new grid lines besides a new grid point. Grid lines may be configured to be visible or to remain hidden. A grid setting program may also provide options for a user to choose visible or invisible grid lines, i.e., to show or hide grid lines.

Optionally, when an object is removed from a screen, one or more grid points and one or two grid lines may be removed from the screen. For example, after object 20 is removed from screen 16 in FIG. 3-A, two grid points and the grid line that goes through grid point 44 and object 20 may be removed. If object 20 is removed from screen 16 in FIG. 3-B, a grid point at the location of object 20 may be eliminated. The grid line that goes through objects 18 and 20 may be adjusted. The adjusted grid line may connect object 18 and grid point 46 only.

Figure 4:
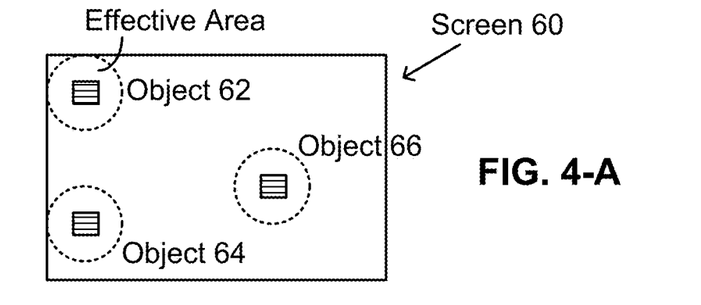

FIGS. 4-A and 4-B show schematically another embodiment which illustrates methods for reaching on-screen objects with ease and convenience. There are three objects 62, 64, and 66 on a display screen 60. An object may be reached or selected when an image of a cursor overlaps an image of the object or a cursor enters the object's boundary which encircles an area a little bigger than the image of the object. In some embodiments, an overlapped or selected object may become highlighted visually on screen to show its status. When reaching an on-screen object is the main task, the object's boundary may be enlarged substantially to make the job easier, as shown by the dotted circle lines in FIG. 4-A. An object's boundary may be expanded greatly to create a larger effective area in some cases. For example, the dimension of an effective area in one direction may be increased by at least fifty percent or at least doubled. An increased effective area makes it much easier to reach an object. In the figure, the size of an object area is about doubled after enlargement, assuming that the original object area has a circular shape. The method may apply to any grid type, such as a fine grid and a coarse grid. An enlarged effective area especially fits the need of gesture methods, as a user may not be able to move a cursor agilely and accurately by finger or hand gestures.

FIG. 4-A represents symmetric boundary enlargement, i.e., enlargement is the same in all directions. Sometimes asymmetric enlargement is in need. For instance, when two objects are placed close to each other, there is little room for expanding the boundary between them. In such a case, the object boundary may be enlarged asymmetrically. It may be arranged that the boundary remains the same at one direction but expanded at other directions. Optionally, the boundary may be expanded less at one direction but expanded more at another direction. A boundary may also be pushed to screen edges as shown in FIG. 4-B, where the dotted lines, which represent mutual boundary lines, divide screen 60 into three rectangular-shaped portions belonging to the three objects. In such a scenario, every spot on screen 60 belongs to one object or is located in one object's effective area. Thus wherever a cursor goes, it is with an object or makes an object highlighted. A cursor may appear at certain distance away from an object on screen. However, as long as it is inside an object's effective area, the object becomes selected and highlighted. It makes it convenient to reach an object, suitable for cases where reaching an object is the main goal, and again especially suitable when gesture input is involved, since a gesture provides coarse cursor control.

The dotted lines which define the effective object areas may be configured to show up or remain hidden. It may be arranged that a user may have options to choose a visible or invisible boundary line and switch between them. For instance, "Edit" mode may be designed. A user may enter the mode and change settings such as how the boundary line is arranged. A user may also have options to choose among regular effective area, expanded effective area, and maximum effective area. The former case represents the current method with a basic effective area. In the second case, a user may have further options to select an enlargement factor or to decide how much an effective area is enlarged. For example, the user may enlarge the effective area by fifty percent or double the effective area. The latter case reflects what depicted in FIG. 4-B, where all screen space is used for effective object areas. Like the object-based grid, the enlarged effective object area may automatically replace the regular effective area after a gesture session gets started, when a user selects certain options in "Edit" mode. An object may remain highlighted after a cursor enters its effective area and stays inside the area. Once highlighted, the whole expanded effective area may change color or brightness.

It is noted that principles of the object-based grid is similar to the maximum effective area shown in FIG. 4-B. Returning to FIG. 3-B for instance. There are four grid points in the figure. Each grid point has an effective grid area. At an object site, the effective grid area and effective object area may be the same. When a cursor enters a grid area, it reaches a grid point automatically. For the object-based grid, a screen is divided into the effective grid areas. No matter where a cursor is, it is in one of the effective grid areas. For instance, screen 16 is divided into four grid areas in FIG. 3-B, corresponding to four grid points. The boundary between grid point 46 and the grid point of object 22 may be arranged by a vertical line going through the midpoint between them. The boundary between point 46 and object 18 may be a horizontal line at the midpoint between them. Thus the effective grid areas may be created by boundary lines which go through midpoints. As such, object 22 may have a single shared boundary line and the largest effective area which occupies about half of the screen space.

When a cursor enter a grid area, its image is placed at the grid point or arranged overlapping an object instantly, even though the cursor's actual position may be away from the grid point. In other words, when an object is highlighted, a cursor is always arranged overlapping it, since the cursor has to be at a grid point for the object-based grid. Thus, when a user moves a cursor on an object-based grid, a control system may detect position of the cursor and determine which effective grid area it is in, and then place the cursor at a corresponding grid point. When a user tries to move a cursor by a hand gesture, the cursor may stay at the same place or same grid point even thought the hand moves. As long as the cursor hasn't entered another effective grid area, it may stay at the same place on screen. For example, in a gesture session, a gesture sensor may measure where the cursor is moved to. If the cursor has not left the old effective grid area, the cursor image on screen may stay put. If it is determined that the cursor enters another effective grid area, the cursor may be moved to the grid point of that area.

Figure 5:
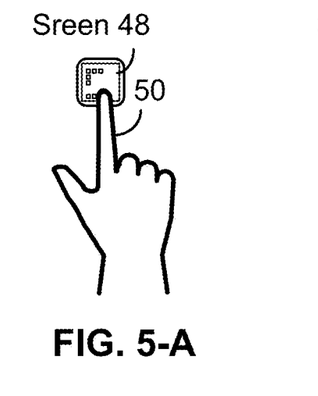

FIGS. 5-A and 5-B are exemplary diagrams showing an embodiment of gesture input for small-sized devices. When a device is small, such as a wearable or some portable device, its display screen is small. Limited screen size means only a few objects can be arranged to appear on screen. When more objects are presented, the object size has to be reduced. Assume that a screen involved is touch sensitive. When two objects are small and placed together on screen, a tap of fingertip may contact them simultaneously, or it may be difficult to pick one between them. As a consequence, only a few items may be displayed visually, providing fewer options than needed. Such dilemma may be overcome by a gesture method. As shown in FIGS. 5-A and 5-B, a small screen 48 may show several tiny objects. The objects may be too small for a finger 50 to select individually, since a fingertip may tap two objects together as depicted graphically in FIG. 5-A. However, the issue may be resolved by a gesture method which is schematically illustrated in FIG. 5-B, i.e., two closely positioned objects may be picked individually and easily by gestures. Finger 50 may move around in the air and choose one object on screen 48 at a time. First, a cursor may be arranged small enough to overlap one object individually. Second, it may be designed that cursor travelling distance is proportional to finger or hand travelling distance with a given ratio, such as larger or smaller than one. For instance, when finger 50 travels a certain distance, a corresponding cursor may move a fraction of the distance on screen 48, or move a longer distance if screen 48 is replaced by a large screen. For example, when a fingertip moves ten millimeters in the air, a cursor may move only one millimeter on screen 48 in the same or similar direction.

Thus a user may move a cursor with small steps, make it overlap a small object, or direct it to travel from one small object to another one conveniently. Therefore, with gesture input, small objects may be placed on a small screen with tight spacing. In some embodiments, the on-screen object size may be smaller or much smaller than a fingertip of an adult user, or the on-screen object dimension may be as small as two to seven millimeters or less, and the spacing between two objects may be as narrow as half millimeter or less. When a cursor overlaps an object, the object may become highlighted. Next, a gesture-based click act may be performed to activate the object or execute a task which is associated with the object. In some cases, a gesture method may be combined with the object-based grid illustrated above to select and move small objects on a small screen.

Figure 6:
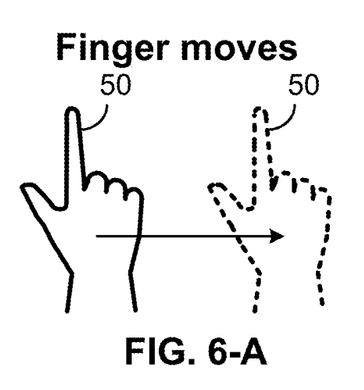

FIGS. 6-A, 6-B, and 7 describe exemplarily certain finger movement which may be used as gesture commands. For instance, the fingertip of index finger 50 may be used as an input tool to direct a cursor movement on screen. When a hand moves, finger 50 moves along, so does the fingertip of finger 50. When the hand remains in place but finger 50 rotates, the fingertip moves too. In both cases, the fingertip changes its position, while the hand may keep straight or maintain a relatively stable state, as illustrated graphically in FIGS. 6-A and 6-B. In both cases, the movement of the fingertip may be used to direct the movement of a cursor on screen with a predetermined ratio between distances travelled in the air and on screen. For instance, when a fingertip moves twenty millimeters horizontally to the right, a cursor may be configured to move two millimeters horizontally to the right. The method applies to other directions. As aforementioned, a detector such as sensor 28 of FIG. 2 may be arranged to capture a series of images of a finger or hand consecutively and continuously. Images in sequence may be analyzed through specific algorithm to identify certain gesture act performed by a user and translate it into gesture instructions.

When a cursor moves on screen, it may highlight a graphic object when it overlaps the object. But a highlighted object doesn't get activated automatically. When the cursor is moved away from the object, the highlight state may end and the object may returns to its original on-screen appearance. This is similar to using a computer mouse to move a cursor to highlight an object on screen.

Activating an object needs a click act. To implement a click act, a finger bending process is introduced graphically in FIG. 7, where finger 50 is used to release a click command. A program may be designed to handle gesture input. When the program of a device obtains information that a finger goes from straight to bent and then back to straight state within a given time period, it may take the movement as a mouse click act and then send a message to a device control unit. Then the device may know where on screen a click action happens. If an object is already highlighted by a cursor, the device control unit may activate the object.

Figure 7:
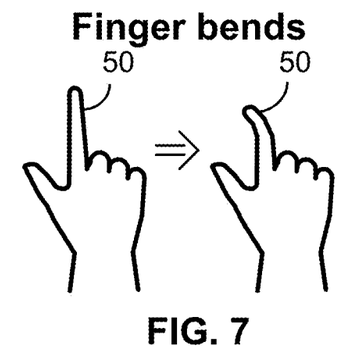

As users may have different finger bending habits, such as causing a finger to point to the right side, the left side, the forward direction, or the backward direction, finger images may have quite different profiles. Assume that an imager or video sensor is right in front of a user, or a user faces the sensor. In the former two scenarios, finger bending may feature a transition from a straight object to a bent object. The transition may be recorded and analyzed. For instance, sequential images taken by a sensor may be used to determine that a straight object bends gradually. On the other hand, for the latter two scenarios, finger bending may cause a transition from a straight object to a shortened straight object. In addition, there are cases in between the former two and latter two scenarios, where images may reflect both bending and shortening processes.

Doing finger bending act twice within certain time may be designed to work as double clicks, which may equal to the well-known double clicks using a computer mouse. A double-click procedure may be used to perform a special task or implement a given function for some cases.

Consequently with a click act carried out by the finger bending method, a highlighted object may be activated. The activation may open a file folder, launch a program, carry out a task or function, or start other activities. It may also be designed that when a finger bends and remains a bent state, it may work like pushing down a button of a computer mouse without releasing it. Then it may be designed that a highlighted object may be dragged to move around on screen with a bent finger. For instance, when a user wants to move an object at a spot on-screen, the user may use a finger to direct a cursor, let the cursor overlap the object, making it highlighted, bend the finger, use the bent finger to drag the object around, and then straighten up the finger to place the object at another spot. When a finger remains in bending state for a given time period or an object is moved by a bent finger, straightening the finger may not cause a click act. So an object may be dragged on screen without concerns of accidental activation.

Figure 8:
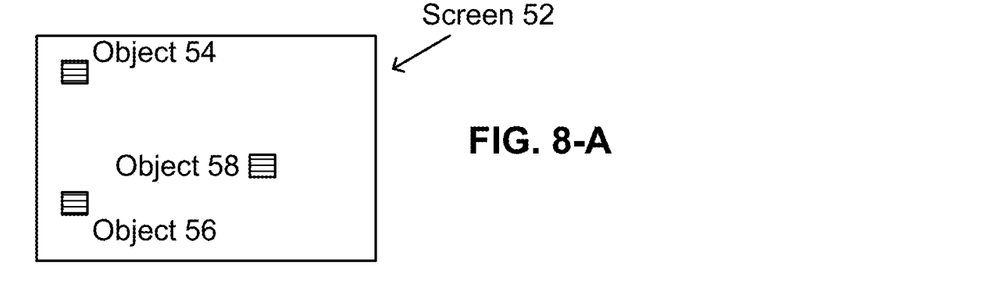

FIGS. 8-A, 8-B, 8-C, and 8-D are schematic diagrams depicting embodiments of a gesture input method. As illustrated above, an act equivalent to a mouse click may be performed by bending a finger and then re-straightening it. However, left-click and right-click may also be desirable in applications. Left and right clicks can be easily performed using a computer mouse's left and right buttons separately. Special finger or hand gestures may be designed to do left and right clicks too. However, gestures for the left click and right click may be too complicated for some users. A simple method for the left click and right click is depicted in the figures schematically. In FIG. 8-A, a device screen 52 shows three objects 54, 56, and 58. Next in FIG. 8-B, object 58 is highlighted using gestures, e.g., by moving a cursor to overlap object 58. A highlighted object may show its status by change of appearance in terms of color or brightness. Although a highlighted object may be activated by finger-bending-and-straightening act, it may work as the left click only, while the right click is ignored this way.

In FIG. 8-C, it is designed that when object 58 has tasks associated with left and right clicks respectively, it shows two arrow icons once being highlighted. If a fingertip moves along the left arrow, then goes backwards to return to the object within a given period of time, e.g., two or three seconds, it may construct a left click. When a fingertip moves following the right arrow and then gets back to the object in certain time, a right click may be implemented. FIG. 8-D shows another exemplary configuration. When object 58 is highlighted, three small icons may appear around it, with two rectangular icons beneath the object for left and right clicks and a hand-shaped icon above the object for dragging it. When the left rectangular icon is highlighted and then clicked, a left click is performed; when the right rectangular icon is highlighted and then clicked, a right click is done. A click may be accomplished by the finger bending process described above. The three icons are temporary icons. They show up when an object is highlighted and stay there when the highlight state continues or disappear automatically when a click or a drag is not received within a given time period. So, a user may move a cursor to highlight an object via a finger gesture, cause temporary icons to show up, let the cursor go further to overlap a temporary icon, optionally making the icon highlighted, and then click on the icon below the object to do a left or right click.

The hand-shaped temporary icon may be used to drag object 58 around. A user may use a fingertip to make a cursor overlap a hand-shaped icon and make it highlighted. Next the user may move the fingertip to drag or move the cursor around on screen. After the object arrives at a spot, the user may click on the hand-shaped icon through the finger-bending method to end the drag process. Then it may return to the state in which object 58 is highlighted along with three temporary icons, if the fingertip goes back to overlap object 58. The highlight state may come to an end when the cursor moves out of the boundary of object 58. When an object is no longer highlighted, its temporary icons may be removed from the screen.

Figure 9:
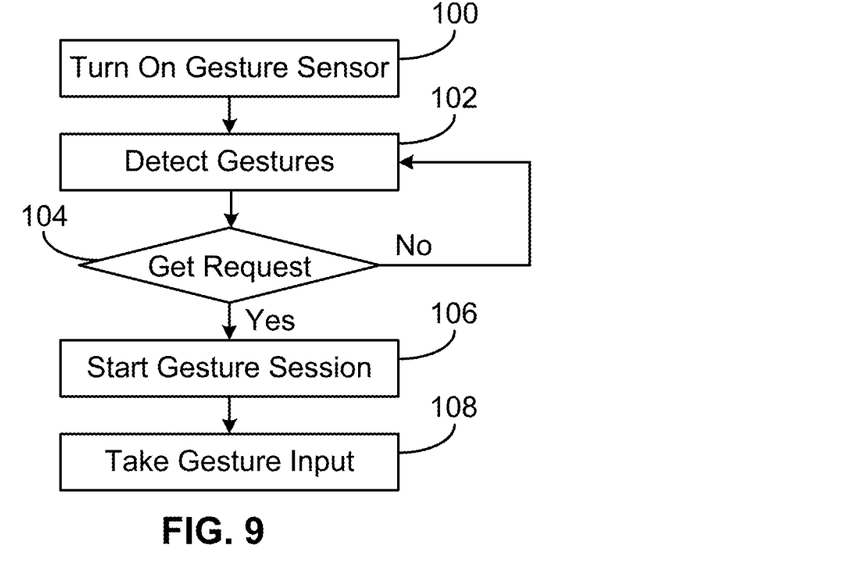
FIG. 9 shows an exemplary flow diagram of a gesture input session in accordance with the present invention.

FIG. 9 is a schematic flow diagram to describe a gesture input session. At step 100, a user switches on a gesture sensor. A gesture sensor may mean a detecting system or component which is arranged to acquire, analyze, and interpret user gestures. The sensor may be in always-on mode, or turned on by various means and methods. Next at step 102, the sensor may start a detecting process to search for a gesture session request generated by the user. At step 104, a detecting result is made in a certain time frame. If the result is negative, meaning there is no request for a gesture session, it may return to step 102 and continue to detect gesture signals. If the result is positive, the sensor may start a gesture session at step 106. A request for gesture session may be made using certain finger or hand gestures, or other methods. Finally at step 108, the sensor may take gestures from the user and translate the gestures into user instructions.

Figure 10:
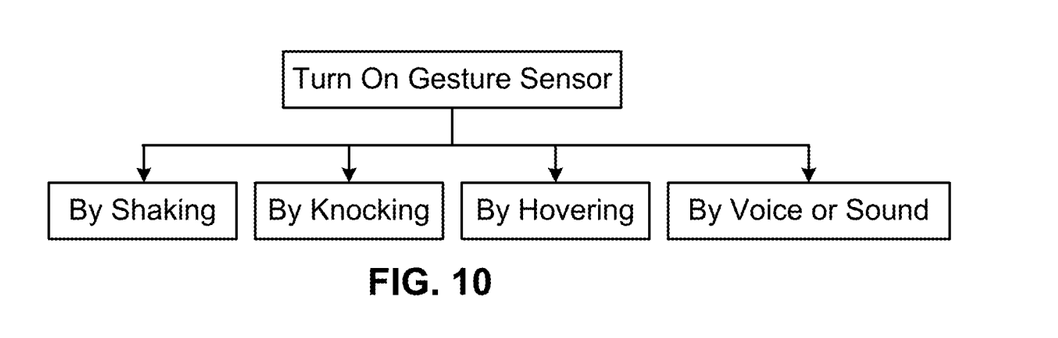
FIGS. 10 and 11 are schematic diagrams showing methods to turn on a gesture sensor and request a gesture input session respectively.

In some embodiments, a gesture sensor may be in operational mode all the time. Alternatively, a gesture sensor may be turned on by a user when there is a need. The former provides convenience to enter a gesture session, while the latter may save energy and reduce privacy concerns. When a sensor is off, it requires a wakeup signal to get activated. A sensor may be switched on via several methods as shown exemplarily in FIG. 10. For a device, it may be designed that a user may turn on a gesture sensor via several acts, such as shaking the device, gently knocking or tapping the device, finger or hand hovering over a touch screen of the device, making a specific sound like clapping, or speaking to the device (e.g., uttering "Gesture"). Details of each method will be illustrated below.

Figure 11:
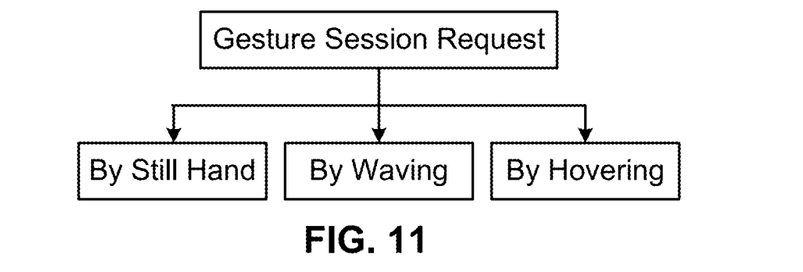

When a gesture sensor is on, a user may generate certain gesture to begin an input session. A request may be made by a hand or finger act in a convenient and easy way. FIG. 11 lists some schemes. A request may be made by holding a still hand in the air or sticking out one or more still fingers in the air, or waving a hand or finger. A request may also be made by finger hovering over a touch screen. It is noted that a hovering finger may be arranged to wake up a gesture sensor and start a gesture session at the same time. Once it is detected that finger hovering happens above a device screen, a signal may be generated to turn on a gesture sensor. Since a finger is already positioned near the screen, it may confirm a user's intention to interact with the device, likely via a gesture method. Then, a gesture session may be arranged to start while a gesture sensor begins working. It is of hover-to-gesture-session scheme. Again, details of each method will be illustrated below.

When a finger hovers over a touch screen, its fingertip may be kept close to the screen surface without contacting it. Hovering may be detected by mature technologies well-known in the art. Hovering act may be performed using other part of a finger, such as a knuckle or other part of a hand. During a hovering event, a user may maintain a small spacing between the screen surface and a fingertip or another part of the hand. The spacing may be between one to seven millimeters or have a value below or beyond the range, as long as it can be detected that an object appears above a screen or close to a screen spot. Hovering also means an object stays around a hovering spot beyond a given period of time such as one or two seconds, which may be arranged to exclude other activities around a screen surface. It is noted that when a screen is in a horizontal plane, hovering may mean staying above a screen surface. When a screen is tilted at an angle relative to a horizontal plane, hovering may mean staying close to screen surface. In a hovering event, a fingertip or another part of a hand may touch a screen surface slightly, if the touch doesn't cause any effect.

Assume that a gesture sensor is already on. A gesture session may get started after a request is received from a user. A request may be made by a user via holding a still hand or sticking out one or more fingers in the air. It may be arranged that when a user holds his or her hand still in the air and keeps it upright with palm facing any direction for certain time, or keeps one or more fingers stuck out in the air for certain time, it represents a request to start a gesture input session. For instance, once a device's sensor gets images of a still hand or finger and gets them for a given period of time (e.g., two to five seconds), the device may start a gesture session. It may be arranged that the fingertip of the index finger may be designated to lead a cursor movement on screen, when index finger and other fingers show up. At the start, a cursor may appear at a certain place, such as the central area of a display screen. Then the cursor may move following the movement of a user's hand or fingertip.

A gesture session request may also be made by waving a hand or waving a finger in the air in front of a device. Assume that a cycle means moving a hand or finger and then moving it back close to the starting place or moving a hand or finger in one direction and then moving it back in the opposite direction. After a cycle, a hand or finger may return to the starting place or a location close to the starting place. It may be designed that one or more cycles may construct a waving act. As a waving hand is often used to get attention of the other party, it may become an easy and natural start of a gesture process. For instance, a user may keep waving a hand or finger until a cursor appears at certain part like a central area of a device screen. Next the user may stop waving and hold the hand or finger still in the air. Then, the user may move the cursor around on screen with the hand or finger, followed by highlighting an object, opening an object, or executing an object by gesture instructions.

Once a session request is received, a sensor may start taking gestures as instructions from a user. To avoid launching a gesture session accidentally due to inadvertent hand or finger movement, the eye-tracking technology may be enlisted to confirm a user's intention. For instance, it may be designed that after gesture signals are received and they mean to launch a gesture session, the signals may prompt start of eye-tracking procedures. When it is detected that a user gazes at a target device or along a direction toward the device for a given time, a gesture input session may begin. But if it is detected that the user does not gaze at the device for certain time, the session request which is received shortly ago may be discarded.

Gestures may also be used by a user in a hailed vehicle (e.g., an autonomous vehicle or driverless vehicle) or a self-service store (e.g., a store without cashiers) to issue a command. When a user wants to start a gesture input session in a vehicle or a store, the user may use methods depicted above. In some embodiments, as a user may hail a vehicle multiple times or go to a store multiple times in the past, records of the user may be used to analyze the habit of the user. If it is determined that the user gestures to submit commands several times in a given time period (e.g., three to six months), a gesture input session may start after the user gets in a vehicle or enters a store. For example, a user may be recognized through a facial recognition method, a fingerprint method, an ID card, a card the user uses in the vehicle or the store, certain reservation information, etc. After the user is recognized or identified, records of the user may be retrieved from service center or a service facility. Then, service center or a control system of the vehicle or store may find that the user used gestures multiple times based on the retrieved information. Thereafter, it may be determined by service center or the control system that the user may use the gesture input method again and the control system may start a gesture input session for the user immediately. For example, the retrieved information may reveal that the user used gestures or a combination of verbal commands and gesture input. As the gesture method was used in the past, the control system may turn on one or more gesture sensors if the gesture sensors are in inactive mode and start a gesture input session for the user automatically.

In some embodiments, a sensor or control system may monitor a user after the user gets in a vehicle or walks in a store. The control system may recognize or identify the user using one or more identification methods described above. After the user is identified, the control system may send a request message to service center requesting data on the user. Service center may retrieve information of the user from records stored at database. The records may contain when and where the user used gestures to submit commands, which may indicate that the gesture method is suitable for the user. The records may also contain a conclusion made previously that indicates the gesture method is suitable for the user. Then, service center may transmit a reply message to the control system to pass the retrieved information or the conclusion. The control system in turn may start a gesture input session after receiving the reply message. If a gesture sensor is in off, idle, or standby mode, the control system may wake up the gesture sensor and make it sense the user in the gesture input session. Further, when the records of the user show that the user used an index finger multiple times in the past, the control system may allocate more time monitoring the index finger than other fingers. If the records include certain gestures the user made in the past, these gestures may have higher priority when the control system determines what gesture the user is making or just made. That is, when the user gestures, the control system may compare a detected gesture to gestures in records first. If there is no good match, the control system may compare the detected gesture with other gestures. It may yield better interpretation of the gesture input and improve user experience.

As illustrated above, a shaking act may be used to switch on a gesture sensor. A shaking act may be recognized by a motion sensor like sensor 24 of FIG. 2. Not every shaking event may qualify as a turn-on signal. A shaking process, featured by a profile of back-and-forth movement, has to last longer than a given time but shorter than another given time. The first condition is meant to confirm that a user shakes a device on purpose. The second condition is used to exclude other shaking phenomena like shaking caused by a boat or vehicle, which may last a while. It may be designed that when a device experiences shaking for certain time, such as two to five seconds, it may trigger a gesture sensor. Optionally, a gaze sensor may be employed to detect whether a user gazes at the device to confirm his or her intention.

For devices of all sizes, like smartphones, wearable or portable gadgets, and big screen televisions, a gesture sensor may be switched on when a user gently knocks or taps the body of device. A detector like sensor 24 of FIG. 2 may be arranged to recognize the knock or tap act which causes a shaking event. It may be designed that the knock or tap act should happen at least two times but less than, for instance, five times. Knocking too many times may mean something else happens. After the knock or tap signals are received, the device may wake up a gesture detecting sensor. Then a user may make gestures to request for a gesture session, like holding a hand upright until a cursor appears. Next, a user may move the cursor to a target icon, "click" on it using the finger-bending method, move the cursor to another spot, and so on.

A gesture sensor may also be turned on by a hovering act. When it is detected that an object, including a finger, a hand, a pen, or other object, hovers close to a touch screen for a given period of time (e.g., two to five seconds), a gesture sensor may be turned on and a gesture session may start with an emerging cursor or icon shown on screen at the same time. Then a user may either skip a gesture session by tapping on the screen or gesture in front of the screen to give instructions remotely. For instance, when a fingertip hovers close to a touch screen for a time period beyond a certain value, the device may follow a program to turn on a gesture sensor and start a gesture session at the same time. Consequently, the device may become ready to receive gesture instructions as well as taps on the screen. A user may either tap an object directly on the screen, or move a fingertip in the air to perform a gesture-based click. It may be designed that after a hovering act triggers a gesture session, a cursor may appear at a screen spot close to the hovering fingertip or hovering object. Next the cursor may be moved around on screen by the fingertip or hand. The ratio between a distance a fingertip travels in the air and a distance a cursor moves along the same direction on screen may be predefined and remain adjustable by a user. For a small screen, the ratio value may be arranged larger or much larger than one to accommodate comfortable controlling needs. For a big screen, the ratio may be smaller than one.

Methods of a hover-to-gesture-session as illustrated above may be helpful for devices with a small screen size, as graphic objects on a small screen may be small and thus there may be difficulties when tapping has to be performed. Gesture input gives a user an alternative means, when tapping becomes hard to do in some cases. On the other hand, for devices with not-so-small touch screen, such as a smartphone or a tablet computer, having one more input option is also helpful. For instance, when a finger is near a touch screen, it helps when both tapping and finger gesturing work. As a user may either touch a screen or keep a distance from the screen when interacting with the device, which may create comfort, ease, and certain freedom. During hovering, a fingertip may be out of the field of view for a gesture sensor, since a sensor and screen surface may be arranged in the same plane. For instance, smartphones, tablet computers, and certain wearable devices may have such configuration. Thus it may become difficult for a gesture sensor to detect a fingertip and its movement when the fingertip is close to the screen surface. In such cases, a user may move a hovering finger away from the screen and into the sensor's field of view if the user wants to use the gesture method.

Alternatively, a gesture sensor may also be waked up by certain sound like a user's voice command or some special but easy to make sound. Voice recognition technology is mature and may be incorporated with a gesture method to make it easy and convenient for some users. For instance, assume a voice recognition system is on. A user may utter "Gesture" to turn on a gesture sensor. After that, the user may gesture for a session request, such as waving a hand to bring a cursor on screen, get the cursor to overlap an object, execute an application associated with the object, and so forth. Optionally, a user may also utter "Gesture" to turn on a gesture sensor and start a gesture session at the same time. Further, a gesture sensor may be turned on when a hand clapping sound, a whistle, or a knocking sound is received. The sound method may be combined with the eye-tracking scheme too. For instance, after a device receives a verbal command "Gesture", it may open a sensor to check the gaze direction of the user. If the user gazes at the device or screen, it may confirm that the user wants to do gesture input. Then the device may turn on a gesture sensor and prepare to take and analyze gestures the user may make. If the user gazes at a direction toward another place, the verbal input may be ignored while the gesture sensor may remain in down or sleeping state.

When a gesture sensor of a device is waked up, the device may have a screen in active or inactive mode. The inactive mode may mean a dark screen or a screen with a screensaver program. It may be arranged that an inactive screen may not be affected by a wake-up event of a gesture sensor. For instance, a dark screen may remain dark until receiving a request for a gesture session from a user. After a session request is received, an icon like a cursor may appear on screen. After a user moves a cursor on screen, a dark screen may turn bright to show an interface which may be the one before the screen went dark, a screen view of locked state, or a screen view of another prearranged program.

In above descriptions, a fingertip may be arranged to direct the cursor movement on screen. For instance, when a user sticks out a finger to request for a gesture session, the fingertip may be observed and its move in the air may lead to a corresponding move of the cursor on screen. When a user holds a still hand with spreading fingers to request a gesture session, the fingertip of the index finger may be used as an indicator to direct the cursor movement. A gesture session may start with appearance of a cursor image on screen.

In some cases, a task may involve selecting and activating an on-screen object, which may be accomplished using gesture instructions. In some other cases, a task may involve scrolling a screen view up or down, moving it toward the right-hand side or left-hand side, or sliding it to turn a page. Using a cursor to implement such tasks may be doable but may not be that convenient. Thus, it may be designed that when one or two fingers stick out, it may mean a user wants to use a cursor. Then a fingertip is locked to lead the cursor movement. When three or more fingers stick out including a still hand with spreading fingers, it may mean a user wants to move a screen view or a screen page. If the fingers move from a spot to the right, the screen page may be dragged to the right. If fingers or hand moves to the right then moves back to the left, the screen page may be dragged to the right and then dragged back to left. Similarly, a screen page may be dragged upwards or downwards. When a screen page is dragged away from its original position, another screen page may be arranged to fill the void. When a new screen page is totally moved in, the new page stays and a page is turned. Thus, a user may turn a page by moving stuck-out fingers to the right or left until a new page occupies the whole screen. To continue reading, the user may put stuck-out fingers back to a place, and then make another move to turn another page. After a page is turned, a user may have to move a gesturing hand to a place for another action. For instance, after sliding fingers for a distance towards the left direction, a page is turned. Next a user may move the fingers back and let them stay in the air for at least a given time, which may mean the user is ready for another page-turning action. Then the user may slide fingers to the left or right to turn a page forward or backward, which is unrelated the previous move.

When a cursor appears on screen, it may be called cursor mode. When a screen page moves around with fingers, it may be called page-moving mode. Cursor mode and page-moving mode may be arranged switchable. For instance, when one or two stuck-out fingers are detected, the cursor mode gets started. The cursor may move following the finger movement. When three or more stuck-out fingers are detected, the page-moving mode takes place. Screen page moves following the movement of the fingers. Mode switching may happen anytime as long as certain finger gesture is detected.

CONCLUSION, RAMIFICATIONS, AND SCOPE

Thus it can be seen that systems and methods of gesture input are introduced and illustrated.

The improved method and system have the following features and advantages:

(1). A screen grid may be made self-adjustable and object-based to make it easy and convenient to reach an object;
(2). An effective area of an object may be enlarged to make it easy and convenient to reach the object;
(3). Gestures may be used to reach small-sized objects on a small screen;
(4). Finger and hand gestures may be designed to move a cursor, perform a click act, or move a screen page;
(5). Temporary icons may be arranged around an object for conducting a left click, right click, and drag act;
(6). A gesture sensor may be turned on by a shaking, knocking, hovering act, certain sound, and verbal instructions;
(7). Hand gestures and a hovering act may be used to start a gesture session; and
(8). Hovering act may be arranged to switch on a gesture sensor and start a gesture session at the same time.

Although the description above contains many specificities, these should not be construed as limiting the scope of the invention but as merely providing illustrations of some of the presently preferred embodiments. Numerous modifications will be obvious to those skilled in the art.
Ramifications:

Besides index finger as used in FIGS. 5-A, 5-B, 6-A, 6-B, and 7, other fingers may be used to do the gesture input too. For instance, a user may stick out any finger and hold it still in the air. Next, the finger may be recognized, picked, and monitored. The user may use the finger to request for a gesture session. The user may also use the finger and its fingertip to direct a cursor on screen and perform other gesturing activities.

In FIG. 8-D, in cases when object 58 has no right-click function, it may be designed that only the hand-shaped icon shows up when the object is highlighted. In FIGS. 8-C and 8-D, when object 58 has the right-click function, it may be designed that clicking on the object itself means left click. Thus in one configuration, the arrow or rectangular icon on the left side may be removed. When an object is highlighted, only a right arrow or right rectangular icon emerges below the object. It may simplify the screen view.

Temporary icon method as described in FIGS. 8-C and 8-D may be applied to a touch screen scenario too. Currently, when an object is tapped on screen, meaning the object is touched briefly, it is activated. When an object is pressed continuously beyond certain time, more options to deal with the object may show up if there is such arrangement. But pressing an object for a prolonged period of time may cause uneasiness and anxiety. It may be designed that when a fingertip hovers over an object for a given short period of time, say one or two seconds, the object may be highlighted. Once an object is highlighted, temporary icons, like the arrows, the rectangular or hand shapes, may show up around it for a given brief period of time. A user may tap a temporary icon to execute a task. Thus, these temporary icons may appear and work in the same way as that introduced in FIGS. 8-C and 8-D. Like in a gesture process, the same temporary icons may be arranged for an object: An icon for right click, which may be placed on the right-hand side beneath the object, assuming left click may be done by tapping the object directly; and an icon for dragging the object, which may be placed on top of the object. So, a user may conveniently highlight an object by finger hovering, and then tap to do left or right click, or drag the object to another place on screen. The hover-to-highlight scheme applies to devices with a touch screen and hovering detection capability, including wearable devices, smartphones, tablet computers, and the like.

Figure 12:
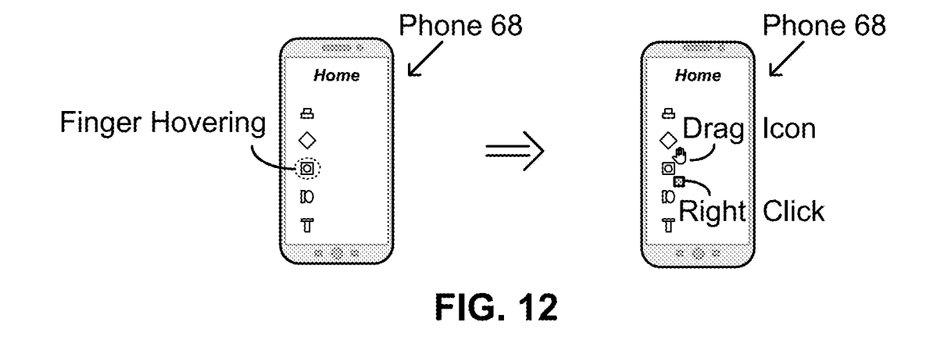
FIG. 12 is an exemplary diagram showing temporary icons generated for on-screen objects in accordance with the present invention.

An embodiment of gesture input with a smartphone is illustrated graphically in FIG. 12. Assume a smartphone 68 has some objects configured on a touch screen. When a fingertip hovers over an object, two temporary icons may appear around the object for a given period of time (e.g., two to five seconds). A hand-shaped icon on top of the object may be used to drag the object to places on screen. A rectangular icon below the object may enable the right-click functionality. A user may relocate the object by keeping fingertip touching or pressing the hand-shaped icon and moving the fingertip on screen at the same time. After moving an object to a place, the user may lift the fingertip off the screen surface. Then, the object may stay there until being moved again. A user may tap the rectangular icon to do the right-click on the object, or tap the object itself for a left click.

For an AR device or VR device, performing finger hovering over an on-screen object may not be available. Optionally, for AR or VR devices, it may be configured such that when a cursor overlaps an object for at least a given time period (e.g., two to five seconds), the overlapping act may have the same effect as a fingertip hovering over an object. Hence, when an AR or VR device determines, by detecting gestures and/or other input signals from a user, that a cursor overlaps an object, the AR or VR device may display temporary icons (e.g., the arrow or rectangle for the right click and the hand shape for dragging) around the object. Then the user may perform the right click or the left click, or drag the object around on screen using, for example, gestures. The user may also do the clicking and dragging using gestures and verbal commands sequentially or at the same time. For example, a user may use gestures to move a cursor to overlap an object on a virtual screen to show the temporary icons, and then utter "Right click" to do a right click on the object.

In some embodiments, the movement of a fingertip may be used to enlarge an image of an object. For example, if it is detected that a fingertip hovers over an object on a screen for a short time period (e.g., two-five seconds) and then the fingertip starts descending from the hovering position to the screen surface, the image of the object may be enlarged gradually. The closer the fingertip to the screen surface, the larger the image of the object becomes. Thus, a user may hover a fingertip over an on-screen object and then let the fingertip approach the screen surface slowly. As the fingertip gets closer to the screen surface, the image of the object is enlarged on screen further. Hence, if it is detected that a fingertip approaches to an object on a screen surface slowly along a direction perpendicular to the screen surface, the image of the object may be enlarged gradually. In the embodiments above, the slow moving fingertip works as a magnifier to magnify an image of an object. A slow moving fingertip that approaches a screen surface may indicate a fingertip that coming to the screen surface along a direction approximately perpendicular to the screen surface and the approaching process lasts longer than a given time period (e.g., two or three seconds).

In some embodiments, a device may detect and/or monitor a fingertip above its screen surface. When the device detects that the fingertip hovers over an object on the screen for a given time, the image of the object may be magnified according to a given setting and optionally, temporary icons as described above may be presented around the enlarged image. Alternatively, a device may monitor a fingertip above its screen surface. When the device detects that the fingertip approaches an object on the screen slowly along a direction perpendicular to the screen surface, the image of the object may be magnified gradually according to a given setting and optionally, temporary icons as described above may be presented around the enlarged image. As the device detects that the fingertip coming closer to the screen surface, it may enlarge the image of the object further. For example, the device may measure the distance between the fingertip and the screen surface and enlarge the image based on the distance. A smaller distance may cause greater image enlargement. When the fingertip touches the screen surface, the image may get maximum magnification. After an object image is enlarged, the user may move the fingertip to overlap, for example, one of the temporary icons while maintaining similar distance from the screen surface and activate a select icon.

In FIGS. 5-A and 5-B, the gesture method is utilized to select a small-sized object which may be hard to contact through a tapping act since the objects are small and two or more neighboring objects may be engaged simultaneously by a fingertip. The situation has another solution. When two or more graphic objects are tapped together on a touch screen, because of the small object size or other reasons, it may be designed that the tapped objects may appear with an enlarged size for a given short time (e.g., two to five seconds), so that a user may select one object and tap the object. The process is depicted graphically using a small device in FIG. 13. Assume that two small objects are tapped simultaneously on screen 48 by a user because they are small in size and placed close to each other compared to the size of a fingertip. With the new scheme, the two tapped objects may be enlarged, such as big enough for individual selection using a fingertip. Then the user may select and tap on one of them. Further, options may be provided such that a user may choose an enlargement setting that fits a need.

The tap-to-enlarge scheme applies to smartphones as well, when the object size on the phone screen becomes too small for a fingertip to tap exclusively among multiple items. In addition to tapping, hovering may be used to deal with small objects, too. It may be designed that when a fingertip hovers over two or more objects on a touch screen, size of the two or more objects may increase for a short given period of time (e.g., two to five seconds). Then a user may tap one object to select it. For instance, when a user prefers more folders and applications on screen, the object size may be reduced to accommodate the need. Then the tap-to-enlarge or hover-to-enlarge schemes may be used if the object size becomes a problem. The scheme applies to devices having a touch screen, and is especially useful for devices with a small screen.

Figure 13:
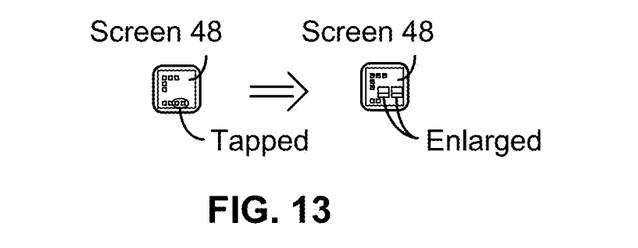
FIG. 13 is an exemplary diagram showing an embodiment of enlarging small objects on a touch screen in accordance with the present invention.

Moreover, the schemes described in FIGS. 12 and 13 may be combined. When two or more objects on a touch screen are tapped or covered in a hovering act simultaneously, the two or more objects may be enlarged in size along with the temporary icons arranged around each of them. Thus, tapping or hovering may not only increase the size of small objects, but also bring icons to enable additional functions such as right click and drag.

Further, the combined enlarge-with-icons-by-tap-or-hover method may apply to screen objects with a normal size. It may be designed that when two or more objects are tapped on a touch screen, or a finger hovers over two or more objects on a touch screen, temporary icons may be arranged to show up around each involved object. Then a user may tap a selected item. The objects may have a normal size, and thus maybe no size enlargement is needed. Because extra icons take space, the selected objects may be allowed to have a larger area for a short time. The method brings convenience in some case. For instance, when a user wants to access one object, but accidently taps on two objects together, nothing may happen or a wrong object may be selected according to current settings. When the user realizes the mistake, he or she may have to re-do the process. With the new scheme, extra icons may emerge around the two objects. The user may proceed to tap a target object or icon, enjoying a smooth experience.

Besides smart phones, tablet computers, and wearable devices, gesturing methods as illustrated above apply to televisions as well. The gesture input may complement a remote control device. Assume that a television is equipped with a gesture sensor such as sensor 28 of FIG. 2. The gesture sensor may be in the operational mode all the time in some embodiments. Optionally, the gesture sensor may be switched on by a user. For instance, clapping may be used to turn on a gesture sensor. A user may clap hands to make a sound once or twice to trigger a gesture sensor, assuming that a sound sensor, which monitors audible signals, is in active mode. A gesture sensor may also be switched on when a user gently knocks or pats on the television body, assuming a sound sensor or vibration sensor is already on. The above power-on schemes apply to a television in both on and off state. Alternatively, it may be designed that pushing an "On" button on a television body at any time, whether the television is on or off, may trigger a gesture sensor, where it may be either a soft or hard button. For instance, after a user pushes an "On" button on a television set to turn it on, both the television and a gesture sensor may be waked up. Thus when a television begins showing programs, its gesture sensor may get started as well and stay in active mode for a given period of time. So in multiple ways, a user may turn on a gesture sensor of television.

After a gesture sensor is on, it may take images and recognize finger or hand gestures. Next, a user may request a gesture session, which has been introduced in the above. For instance, to start a gesture session, a user may keep a still hand in the air, stick one or more fingers out in the air, or wave a hand or finger in front of a television for one or more times. As illustrated before, an eye-tracking mechanism may be optionally incorporated to confirm the intention of a user after receiving initial wakeup input and/or gesture signals, which may prevent inadvertent act or gestures from starting an unwanted event. At the beginning of a gesture session, a cursor may appear on the television screen along with some graphic objects representing control options. It may be designed that a cursor always appears around certain place initially, like a central, edge, or corner area of the screen, for easy memory and easy sighting.

Figure 14:
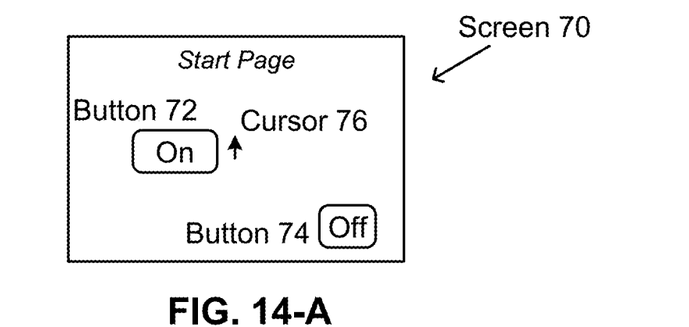

FIG. 14-A is an exemplary diagram illustrating an embodiment to turn on a television. Assume a gesture sensor is on or is turned on by a user action and next the sensor senses an upright hand and starts a gesture input process. At first, a screen 70 is powered on after receiving the initial request from user. It may be designed that the screen displays a title "Start Page", an "On" button 72, an "Off" button 74, and an arrow-shaped cursor 76. Cursor 76 may appear at the central area of the screen and always show up in the area at the beginning of a session after the screen is turned on. Next, a user may move cursor 76 to overlap button 72 and use a gesture-based click to activate the button, which may turn on the television system. If a user doesn't want to turn on the television, the user may "click"

on button 74 using gestures. If no gesture input is received for a given period of time, the screen may turn off by itself automatically.

In FIG. 14-B, an embodiment is illustrated graphically for controlling television in operational mode. Assume that when a television is showing a program, it receives signals to start a gesture input session. Because screen 70 is showing the program content, anything introduced on screen should not affect the presentation to a certain degree. As in the figure, it may be designed that when a request to start a gesture session is received during a presentation of a television program, screen 70 may be split into two areas by a boundary line 78: A large area for continuing to show the program, and a small area for displaying a cursor and option buttons. The small area may be a narrow area at the bottom as depicted in the figure, or a narrow area along the left or right edge of the screen, or a small rectangular area at a corner. The small area may be designed to take less than one eighth of screen area to minimize the impact on user experience. A cursor and one or multiple buttons may be configured in the small area. Again, a cursor may always emerge around the center of the small area. The cursor may be limited to move around in the small area only. As shown in FIG. 14-B, an arrow represents the cursor in the small area. The buttons may include a "Menu" button and a "Close" button. The "Menu" button may lead to a menu window or menu page, which may occupy a larger portion of screen than the small area when displayed. A "Close" button may be used to close the small area and terminate a gesture session. In addition, more buttons for functions frequently used may be added to the small area, such as a "Last" button (not shown) for switching to the a previous program or a previous channel, a "Power Off" button (not shown) for turning off the television, a button (not shown) for enlarging the small area and showing more content items, or a volume control button (not shown). A user may also have an option to avoid splitting the screen, if the user prefers to have cursor and buttons showing up in a screen view of an ongoing program. For the convenience of a user, the television screen grid may be object based, or objects on the television may have expanded boundaries. Further, a temporary icon may appear to enable the right click when an object is highlighted.

Besides "On" button, other buttons on a television body may also be arranged to wake up a gesture sensor, when the television is on. Moreover after a television is switched on, more buttons on a remote control device may be arranged to wake up a gesture sensor. It may be designed that when a button on a remote control is pressed, for instance, an "On" button when the television is off, or any other button except "Off" button when the television is on, a gesture sensor may be prompted to start working. The reason is that, aside from a user who has a remote control, other users on site may want to control the television too. A remote control device may provide a good chance to launch a gesture session. After a user uses a remote control device to activate a gesture sensor, another user may gesture to request a session within a given time period. Next, a gesture input session may start and a screen view like FIG. 14-B may appear, since the television is already on. If a session request is not received after a given time period elapses, the gesture sensor may return to off state.

Voice recognition technology may be used to enhance the gesture input method in addition to activating a gesture sensor as aforementioned. In particular, a verbal command may be enlisted to do a "click" job, with the same effect as a click performed using a computer mouse or "click" by the finger bending method. For instance, it may be designed that after an object is highlighted by hovering or cursor overlapping, a user may say "Click" to the device to implement a clicking act, which may activate the object, or launch a program associated with the object. A user may also say "Right click" to do a right-click task on a highlighted object. The verbal method is especially suitable for small devices, such as smart watches, smart bands, smart phones, AR devices, and VR devices, since these devices may be at a place close to a user and thus well positioned to receive verbal commands from the user.

Two or more methods as described above may be combined when they are not in conflict. For instance, hover-to-highlight, hover-to-enlarge, and hover-to-gesture-session may be incorporated. It may be designed that, when a hovering event happens, an object or several objects may be highlighted, attached with temporary icons, and enlarged in size when necessary, and a gesture session may get started. A user may either tap on a touch screen, or make gestures in the air to give instructions. It may make interaction between a device and a user more user-friendly and more versatile. The combined schemes may apply to certain devices that have a touch screen, hovering detection capability, and gesture input functionality.

Finger-bending as a click act is illustrated in descriptions above. If a finger goes from straight to bent to straight state, it may generate a "click" action. Alternatively, if a user makes a finger move in the air so that the fingertip goes from one place to another place, and then back to the origin or original place within a given period of time, the finger movement may be designed as a "click" process, too. Since it may be inconvenient for a fingertip to return precisely to the original place for some users, it may also be designed such that a fingertip only needs to be back at a place relatively closer to the origin than a turnaround point for completing a "click" job. For instance, assume that the distance between an origin and turnaround point is of A. After traveling to the turnaround point, a fingertip may make a "click" act after it goes back to a place which may be anywhere between a middle point and the origin, or within a distance of half A from the origin. The middle point is located at the middle between an origin and a turnaround point. As it is the original, turnaround, and final positions of a fingertip that matter, whether the finger bends or not may become irrelevant. In other words, as long as the fingertip travels back and forth, every time it returns to the original place or get close to the original place, a click act may be considered accomplished, while the finger may keep straight or go through a bending process, or the fingertip may travel in a straight line and/or curved line during the process. The duration of a gesture-based click act is shorter than a certain value. If a finger goes to a place and stays there beyond a given time frame, it may be considered that the fingertip moves to a new place. Then even if the fingertip comes back to the origin, it may mean it is back only, and a click is not conducted.

When a finger is recognized, the finger gesture may be used to do the click and other tasks. In some cases, a fingertip may be selected as an observation spot for gesture detection. Alternatively, other parts of hand or the hand itself may be selected as an observation spot too. For instance, any moving part of a hand may be chosen and followed in a monitoring process. Once a hand of a user is recognized, a gesture sensor may be arranged to detect what part of the hand is moving and how it moves. A moving part may be one or more fingers, or the hand itself. A hand may have spread fingers or other gestures like a first with palm facing any direction, as long as it can be recognized as a hand. When the finger movement is observed while the hand remains relatively stable, a fingertip or another part of the finger may be selected as an observation spot and monitored. When the whole hand moves, any part of the hand which remains visible may be chosen as an observation spot and monitored. When a finger image is fuzzy due to sensor resolution or large distance between a finger and a sensor, a hand image may become the only target to detect and monitor, serving as an observation spot. When the hand movement is observed, the center or any spot of a hand image may be chosen for observation and be monitored. For instance, when a user moves a hand from one place to another place, a cursor may moves on screen accordingly, as directed by the trajectory of an observation spot of the hand. When it is detected that a hand does a back-and-forth act, like moving to a place in the air and then getting back to a place around the origin within a given time period, say two or three seconds, it may be determined that a click act is performed.

In some embodiments, when a user taps on a touch screen, it may be configured to turn on a gesture sensor and start a gesture session besides implementing a tapping act. Assume a user taps on an object which is an icon of a folder. Next a window of the folder may pop up, and an arrow as a cursor may appear at the place where tapping happens. The arrow may mean a start of a gesture session.

Lastly, besides the optical imaging method which captures video signals of gestures, the gesture input may also be detected by ultrasonic technology, radio-frequency technology, infrared technology, or other suitable technologies.

Therefore the scope of the invention should be determined by the appended claims and their legal equivalents, rather than by the examples given.

The invention claimed is:

1. A computer-implemented system comprising:
a processor;
a display; and a memory device coupled to the processor, the processor executing instructions to:
arrange a plurality of first graphic objects at a plurality of different first locations on the display;
in response to arranging the plurality of first graphical objects, generate a plurality of first horizontal grid lines, a plurality of first vertical grid lines, and a plurality of first grid points on the display, wherein each of the plurality of first horizontal grid lines goes through at least one of the plurality of different first locations, each of the plurality of first vertical grid lines goes through at least one of the plurality of different first locations, each of the first grid points is generated at one of the plurality of different first locations or when a horizontal grid line from the plurality of horizontal grid lines and a vertical gridline from the plurality of vertical grid lines intersect;
add an additional second graphic object at a second location on the display;
in response to adding the additional second graphic object to the display at the second location, generate an additional vertical line or additional horizontal line going through the second location such that the additional vertical or additional horizontal line intersects one of the plurality of first horizontal or one of the plurality of first vertical grid lines;
generate an additional grid point at the second location on the display;
detect a hand or finger movement by a user to obtain gesture information; and
move a cursor to the additional grid point or one of the plurality of first grid points when it is detected that hand or finger moves from a first position to a second position.

2. The system according to claim 1, wherein a position of each of the plurality of first grid points is determined by at least one of the plurality of first locations.

3. The system according to claim 1, further including generating both the additional horizontal grid line and the additional vertical grid line after the additional second graphic object is added at the second location on the display.

4. The system according to claim 1, further including a grid program which provides a plurality of options for the user to display or hide the plurality of horizontal grid lines and the plurality of vertical grid lines on the display.

5. The system according to claim 1, wherein one of the plurality of horizontal grid lines and/or one of the plurality of vertical grid lines is removed after one of the plurality of first graphic objects is removed from the display.

6. The system according to claim 1, wherein an option is provided to the user to add additional horizontal grid lines and additional vertical grid lines that do not go through any of the plurality of first locations and the second location.

7. The system according to claim 6, wherein the horizontal grid lines and vertical grid lines that don't go through any of the plurality of first locations and the second location are removed in response to receiving a user command.

8. A method for displaying a cursor on a display, comprising:
arrange a plurality of first graphic objects at a plurality of different first locations on the display;
in response to arranging the plurality of first graphical objects, generate a plurality of first horizontal grid lines, a plurality of first vertical grid lines, and a plurality of first grid points on the display, wherein each of the plurality of first horizontal grid lines goes through at least one of the plurality of different first locations, each of the plurality of first vertical grid lines goes through at least one of the plurality of different first locations, each of the first grid points is generated at one of the plurality of different first locations or when a horizontal grid line from the plurality of horizontal grid lines and a vertical gridline from the plurality of vertical grid lines intersect;
add an additional second graphic object at a second location on the display;
in response to adding the additional second graphic object to the display at the second location, generate an additional vertical line or additional horizontal line going through the second location such that the additional vertical or additional horizontal line intersects one of the plurality of first horizontal or one of the plurality of first vertical grid lines;
generate an additional grid point at the second location on the display;
detect a hand or finger movement by a user to obtain gesture information; and
move a cursor to the additional grid point or one of the plurality of first grid points when it is detected that hand or finger moves from a first position to a second position.

9. The method according to claim 8, wherein a position of each of the plurality of first grid points is determined by at least one of the plurality of first locations.

10. The method according to claim 8, further including generating both the additional horizontal grid line and the additional vertical grid line after the additional second graphic object is added at the second location on the display.

11. The method according to claim 8, further including providing a plurality of options for the user to display or hide the plurality of horizontal grid lines and the plurality of vertical grid lines on the display.

12. The method according to claim 8, further including removing one of the plurality of horizontal grid lines and/or one of the plurality of vertical grid lines after one of the plurality of first graphic objects is removed from the display.

13. The method according to claim 8, further including providing an option for a user to add additional horizontal grid lines and additional vertical grid lines that don't go through any of the plurality of first locations and the second location.

14. The method according to claim 13, further including removing the horizontal grid lines and vertical grid lines that don't go through any of the plurality of first locations and the second location in response to receiving a user command.

\* \* \* \* \*